US009118373B1

(12) United States Patent
Patel et al.

(10) Patent No.: US 9,118,373 B1
(45) Date of Patent: Aug. 25, 2015

(54) LOW LATENCY SPATIAL MULTIPLEXING MIMO DECODER

(71) Applicant: MBIT WIRELESS, INC., Newport Beach, CA (US)

(72) Inventors: Bhaskar Patel, San Clemente, CA (US); Arumugam Govindswamy, Irvine, CA (US)

(73) Assignee: MBIT WIRELESS, INC., Newport Beach, CA (US)

( * ) Notice: Subject to any disclaimer, the term of this patent is extended or adjusted under 35 U.S.C. 154(b) by 0 days.

(21) Appl. No.: 14/537,167

(22) Filed: Nov. 10, 2014

(51) Int. Cl.
*H04B 7/08* (2006.01)
*H04B 7/06* (2006.01)
*H04B 7/04* (2006.01)
*H04L 1/06* (2006.01)
*H04B 7/02* (2006.01)

(52) U.S. Cl.
CPC .............. *H04B 7/0697* (2013.01); *H04B 7/02* (2013.01); *H04B 7/04* (2013.01); *H04B 7/0413* (2013.01); *H04B 7/08* (2013.01); *H04L 1/06* (2013.01); *H04B 7/0452* (2013.01)

(58) Field of Classification Search
CPC .......... H04B 7/02; H04B 7/04; H04B 7/0452; H04B 7/0697; H04B 7/0413; H04B 7/08; H04L 1/06
See application file for complete search history.

(56) References Cited

U.S. PATENT DOCUMENTS

| 7,920,647 | B2 * | 4/2011 | Murakami et al. | 375/299 |
| 8,675,783 | B1 * | 3/2014 | Matache et al. | 375/341 |
| 2009/0316803 | A1 * | 12/2009 | Paker et al. | 375/260 |
| 2010/0232549 | A1 * | 9/2010 | Oizumi | 375/341 |

\* cited by examiner

*Primary Examiner* — Jean B Corrielus
(74) *Attorney, Agent, or Firm* — Lerner, David, Littenberg, Krumholz & Mentlik, LLP

(57) ABSTRACT

Wireless communication systems normally employ Multiple Input Multiple Output (MIMO) transmission and reception schemes to increase performance and the data rate of the system. Spatial Multiplexing (SM) is used in MIMO systems for increasing the data rate of the communication system by transmitting multiple data symbols on different antennas at the same time on the same frequency. The complexity of decoding spatially multiplexed signals using the optimal Maximum Likelihood (ML) algorithm is high and therefore the throughput is often limited by the processing capability of the receiver. A new approach for an SM-MIMO decoder reduces the search and sorting operations. A pre-computed list of nearest neighbors for a given modulation constellation geometry is used to reduce the search and sort operations. Sorting operations are generally difficult to parallelize leading to increased processing latency. The present approach disclosed provides a low and deterministic latency with reduced complexity decoder for SM-MIMO systems.

20 Claims, 19 Drawing Sheets

| Symbol Sequence | Eight Nearest Neighbor Symbol Sequences | | | | | | | |
|---|---|---|---|---|---|---|---|---|
| 0 | 1 | 4 | 2 | 8 | 5 | 6 | 9 | 10 |
| 1 | 0 | 5 | 9 | 4 | 8 | 2 | 13 | 6 |
| 2 | 3 | 6 | 0 | 10 | 7 | 4 | 8 | 11 |
| 3 | 2 | 7 | 11 | 6 | 10 | 0 | 15 | 4 |
| 4 | 0 | 5 | 6 | 1 | 2 | 7 | 8 | 3 |
| 5 | 1 | 4 | 0 | 6 | 9 | 2 | 8 | 10 |
| 6 | 2 | 7 | 4 | 3 | 0 | 5 | 10 | 1 |
| 7 | 3 | 6 | 2 | 4 | 11 | 0 | 10 | 8 |
| 8 | 9 | 12 | 0 | 10 | 13 | 1 | 2 | 14 |
| 9 | 8 | 13 | 1 | 12 | 0 | 5 | 10 | 2 |
| 10 | 11 | 14 | 2 | 8 | 15 | 0 | 3 | 12 |
| 11 | 10 | 15 | 3 | 14 | 2 | 7 | 8 | 0 |
| 12 | 8 | 13 | 14 | 9 | 10 | 0 | 15 | 1 |
| 13 | 9 | 12 | 8 | 1 | 14 | 0 | 10 | 2 |
| 14 | 10 | 15 | 12 | 11 | 8 | 2 | 13 | 0 |
| 15 | 11 | 14 | 10 | 3 | 12 | 2 | 8 | 0 |

FIG. 15

| Symbol Sequence | Eight Nearest Neighbor Symbol Sequences | | | | | | | |
|---|---|---|---|---|---|---|---|---|
| 0,0 | 0,1 | 0,4 | 1,0 | 4,0 | 0,2 | 0,8 | 2,0 | 8,0 |
| 0,1 | 0,0 | 0,5 | 1,1 | 4,1 | 0,9 | 2,1 | 8,1 | 0,4 |
| 0,2 | 0,3 | 0,6 | 1,2 | 4,2 | 0,0 | 0,10 | 2,2 | 8,2 |
| 0,3 | 0,2 | 0,7 | 1,3 | 4,3 | 0,11 | 2,3 | 8,3 | 0,6 |
| 0,4 | 0,0 | 0,5 | 1,4 | 4,4 | 0,6 | 2,4 | 8,4 | 0,1 |
| 0,5 | 0,1 | 0,4 | 1,5 | 4,5 | 2,5 | 8,5 | 0,0 | 1,1 |
| 0,6 | 0,2 | 0,7 | 1,6 | 4,6 | 0,4 | 2,6 | 8,6 | 0,3 |
| 0,7 | 0,3 | 0,6 | 1,7 | 4,7 | 2,7 | 8,7 | 0,2 | 1,3 |
| 0,8 | 0,9 | 0,12 | 1,8 | 4,8 | 0,0 | 0,10 | 2,8 | 8,8 |
| 0,9 | 0,8 | 0,13 | 1,9 | 4,9 | 0,1 | 2,9 | 8,9 | 0,12 |
| 0,10 | 0,11 | 0,14 | 1,10 | 4,10 | 0,2 | 0,8 | 2,10 | 8,10 |
| 0,11 | 0,10 | 0,15 | 1,11 | 4,11 | 0,3 | 2,11 | 8,11 | 0,14 |
| 0,12 | 0,8 | 0,13 | 1,12 | 4,12 | 0,14 | 2,12 | 8,12 | 0,9 |
| 0,13 | 0,9 | 0,12 | 1,13 | 4,13 | 2,13 | 8,13 | 0,8 | 1,9 |
| 0,14 | 0,10 | 0,15 | 1,14 | 4,14 | 0,12 | 2,14 | 8,14 | 0,11 |
| 0,15 | 0,11 | 0,14 | 1,15 | 4,15 | 2,15 | 8,15 | 0,10 | 1,11 |

LOW LATENCY SPATIAL MULTIPLEXING MIMO DECODER

CROSS REFERENCE TO RELATED APPLICATION

This application is related to U.S. patent application Ser. No. 14/537,411, filed concurrently herewith and entitled "Dual QR Decomposition for Spatially Multiplexed MIMO Signals", the entire disclosure of which is hereby expressly incorporated by reference herein.

BACKGROUND OF THE INVENTION

1. Field of the Invention

The present invention relates generally to wireless communication systems and, more particularly, to methods and receiver architectures for decoding spatially multiplexed signals used in Multiple Input Multiple Output (MIMO) wireless communication systems.

2. Description of Related Art

Typically, as shown in FIG. 1, a wireless communication system comprises elements such as a client terminal or mobile station and base stations. Other network devices may also be employed, such as a mobile switching center (not shown). As illustrated, the communication path from the base station (BS) to the client terminal or mobile station (MS) is referred to herein as a downlink (DL) direction, and the communication path from the client terminal to the base station is referred to herein as an uplink (UL) direction. In some wireless communication systems, the MS communicates with the BS in both the DL and UL directions. For instance, such communication is carried out in cellular telephone systems. In other wireless communication systems, the client terminal communicates with the base stations in only one direction, usually the DL. Such communication may occur in applications such as paging.

As shown in FIG. 2, client terminal/MS 12 typically contains a baseband subsystem 16 and a radio frequency (RF) subsystem 18. Memory 20, such as an external memory, is shown connected to the baseband subsystem 16. The baseband subsystem 16 normally includes a micro controller unit (MCU) 22, a signal processing unit (SPU) 24, data converters 26, peripherals 28, power management 30, and memory 32 as shown in FIG. 3. The SPU 24 may be a digital signal processor (DSP), hardware (HW) accelerators, co-processors or a combination of the above. Normally the overall control of the baseband subsystem 16 is performed by software running on the MCU 22 and the processing of signals is done by the SPU 24.

Analog to digital converters (ADCs) convert a received analog signals into digital for the baseband system to process them. Similarly, digital to analog converters (DACs) convert the processed baseband digital signals into analog for transmission. The ADCs and DACs are collectively referred to herein as "data converters" 26. The data converters 26 can either be part of the baseband subsystem 16 or the RF subsystem 18. Depending on the location of the data converters 26, the interface between the two subsystems will be different. The location of the data converters 26 does not alter the overall function of the client terminal.

An RF subsystem 18 normally includes a receiver section and a transmitter section. An RF subsystem 18 for a time division duplex (TDD) communication system is shown in FIG. 4. The receiver section normally may include one or more receivers. The receiver 34 performs the task of converting the signal from RF to baseband. Each receiver may include mixers 36, filters 38, low noise amplifiers (LNAs) 40 and variable gain amplifiers (VGAs) 42. The transmitter section may include one or more transmitters. The transmitter 44 performs the task of converting the baseband signal up to the RF. Each transmitter may include mixers 46, filters 48, and gain control stage 50. In some architectures of the RF subsystem, some of the components may be shared between the receiver section and the transmitter section. As shown, the receiver section 34 and the transmitter section 44 are coupled to an antenna 54 via a transmit/receive switch 56. Synthesizer 58 is also shown as coupling to the receiver section 34 and the transmitter section 44.

The input of each receiver is normally coupled with an antenna and the output of the receiver is normally coupled with ADC. The antenna, receiver, ADC and other related components are collectively referred herein as "receive chain." FIG. 5 illustrates the elements of a receive chain.

The input of each transmitter is normally coupled with DAC and the output of the transmitter is normally coupled with an antenna through a Power Amplifier (PA) which performs power amplification of the transmit signal. The antenna, PA, transmitter, DAC and other related components are collectively referred herein as "transmit chain." FIG. 6 illustrates the elements of a transmit chain.

Multiple transmit and/or receive chains are commonly used in many wireless communication systems for different purposes. Multiple transmit and/or receive chains in wireless communication systems offer spatial dimension that can be exploited in the design of a wireless communication system. Communication systems with multiple transmit and/or receive chains offer improved performance. The performance improvement can be in terms of better coverage, higher data rates, reduced SNR requirements, multiplexing of multiple users on the same channel at the same time, or some combination of the above. Different techniques using multiple receive and/or transmit chains are often referred to with different names such as diversity combining (maximum ratio combining, equal gain combining, selection combining, etc.), space-time coding (STC) or space-time block coding (STBC), spatial multiplexing (SM), beamforming and multiple input multiple output (MIMO). Normally wireless communication systems with multiple transmit chains at the transmit entity and multiple receive chains at the receive entity are referred as MIMO systems. As discussed in detail below, aspects of the invention described in this disclosure applies to the Spatial Multiplexing MIMO system, i.e., a wireless communication system uses Spatial Multiplexing technique using multiple transmit chains at the transmit entity and multiple receive chains at the receive entity.

In Spatial Multiplexing (SM), a high data rate signal is split into multiple lower data rate streams and each lower data rate stream may be transmitted from a different transmit antenna on the same frequency channel. If signals from different transmit antennas arrive at the receiver antennas through sufficiently different spatial propagation paths, the receiver may be able to separate these streams of data, creating parallel channels on the same frequency at the same time. SM is a powerful technique for increasing channel capacity at higher Signal to Noise Ratio (SNR). The maximum number of spatially multiplexed data streams is limited by the minimum of the number of antennas at the transmit entity and the number of antennas at the receive entity. For example, if the number of transmit antennas at the transmit entity is four and the number of receive antennas at the receive entity is two, the maximum number of spatially separated data streams is two.

FIG. 7 illustrates an example of an SM-MIMO wireless communication system with four transmit chains at the transmit entity, for example the base station, and four receive chains at the receive entity, for example the client terminal.

The signal from a transmit chain arrives at all four receive chains through different propagation paths as shown in the FIG. 7. The receive signal at each receive chains may be a combination of signals transmitted from all four transmit chains and the noise as shown in FIG. 7.

The following notation is used in the description that follows. A subscript to a signal name denotes transmit or receive chain number. When there are two subscripts, the first subscript refers to the transmit chain and the second subscript refers to the receive chain. Let $N_t$ denote the number of transmit chains and $N_r$ denote the number of receive chains. For SM the number of parallel data streams that can be supported is equal to the minimum of the number of transmit antennas $N_t$ and the number of receive antennas $N_r$. Normally a wireless communication system with $N_t$ transmit chains at the transmit entity and $N_r$ receive chains at the receive entity is referred as $N_t \times N_r$ communication system.

Wireless communication systems use different modulation techniques such as Quadrature Phase Shift Keying (QPSK), 16-Quadrature Amplitude Modulation (QAM), 64-QAM, etc. FIG. 8 illustrates a 16-QAM constellation and FIG. 9 illustrates a 64-QAM constellation. The set of all symbols in a given modulation technique is referred as constellation or alphabet. Let the total number of symbols in a constellation be denoted by L and the set of all symbols $a_k$ of a constellation be denoted by $A=\{a_k, \forall k=0, 1, 2, \ldots, L-1\}$. At a given instant, one symbol that represents the input data at the modulator is selected from the constellation for transmission.

Let the transmitted symbol at a given instant of time from the $i^{th}$ transmit chain be denoted by $s_i$ for $i=0, 1, \ldots, (N_t-1)$. Let the received symbol at a given instant of time at the $j^{th}$ receive chain be denoted by $x_j$ for $j=0, 1, \ldots, (N_r-1)$. Let the noise at a given instant of time at the $j^{th}$ receive chain be denoted by $n_j$ for $j=0, 1, \ldots, (N_r-1)$. The symbols $s_i$ used for transmission may be one of the symbols from the constellation of a selected modulation technique at the transmit entity.

The signal from one transmit antenna arrives at all the receive antennas through different propagation paths. When the physical distances between the antennas are sufficiently large relative to the wavelength of the radio frequency (RF) being used by the wireless communication system, the signals in different paths may undergo independent propagation. In practice, the propagation paths may not necessarily be completely independent but the correlation among various paths may generally be low when the antennas are sufficiently far apart. A Spatial Multiplexing decoder may be able to separate the spatially multiplexed data streams as long as correlation among different propagation paths is small.

Let channel conditions between transmit antenna i and receive antenna j be denoted by $h_{i,j}$, for $i=0, 1, \ldots, (N_t-1)$ and $j=0, 1, \ldots, (N_r-1)$.

Mathematically, the relationship between the transmitted symbols, the channel conditions, the noise and the received symbols can be expressed as follows for the case of a wireless communication system with four transmit chains and four receive chains:

$$x_0 = h_{0,0}s_0 + h_{1,0}s_1 + h_{2,0}s_2 + h_{3,0}s_3 + n_0 \quad (1)$$

$$x_1 = h_{0,1}s_0 + h_{1,1}s_1 + h_{2,1}s_2 + h_{3,1}s_3 + n_1 \quad (2)$$

$$x_2 = h_{0,2}s_0 + h_{1,2}s_1 + h_{2,2}s_2 + h_{3,2}s_3 + n_2 \quad (3)$$

$$x_3 = h_{0,3}s_0 + h_{1,3}s_1 + h_{2,3}s_2 + h_{3,3}s_3 + n_3 \quad (4)$$

In matrix notation, for the case of $N_t$ transmit chains and $N_r$ receive chains $$s = [s_0, s_1, \ldots, s_{N_t-1}]^T \quad (5)$$

$$x = [x_0, x_1, \ldots, x_{N_r-1}]^T \quad (6)$$

$$n = [n_0, n_1, \ldots, n_{N_r-1}]^T \quad (7)$$

$$H = \begin{bmatrix} h_{0,0} & h_{1,0} & \cdots & h_{N_t-1,0} \\ h_{0,1} & h_{1,1} & & h_{N_t-1,1} \\ \vdots & & \ddots & \vdots \\ h_{0,N_r-1} & h_{1,N_r-1} & \cdots & h_{N_t-1,N_r-1} \end{bmatrix} \quad (8)$$

$$x = Hs + n \quad (9)$$

Normally, the receiver of the wireless communication system needs to estimate the channel conditions to process the received signals. Wireless communication systems use different techniques to enable the receiver to obtain estimates of channel conditions for different propagation paths between transmit and receive antenna pairs. Some techniques include embedding pilot symbols and/or training symbols along with the data symbols. Receivers normally use the embedded pilot symbols and/or training symbols to estimate the channel conditions. Some receivers may also use the previously decoded data symbols to estimate the channel conditions in addition to the pilot symbols and/or training symbols. In general, a receiver may employ combination of some or all of the available information to estimate the channel conditions. The receiver may use any of the algorithms available in the existing literature to estimate the channel conditions. It is understood that the receiver obtains the required estimates of the channel conditions through techniques known in literature or through some other techniques. Let the estimated channel conditions between transmit antenna i and receive antenna j is denoted by $\hat{h}_1$, for $i=0, 1, \ldots, (N_t-1)$ and $j=0, 1, \ldots, (N_r-1)$ and $\hat{H}$ denotes the matrix of estimated channel conditions.

At the receive entity, the received symbols vector x is known. The channel conditions matrix H may be approximated by the estimated channel conditions matrix $\hat{H}$. Based on these two known matrices, the transmitted symbols vector s may be estimated as $\hat{s}$ by solving the linear system of equations in EQ. 9.

The system of equations represented by EQ. 9 needs to be solved at a rate proportional to the data rate of the wireless communication system. Normally SM-MIMO is used to achieve high data rate in wireless communication systems. Hence the system of equations represented in EQ. 9 needs to be solved at a high rate. For example, in a broadband wireless communication system that offers data rate of 16 mega bits per second over the air using 4×4 SM-MIMO with 16-QAM modulation, EQ. 9 needs to be solved about one million times per second. Therefore, in general the complexity of the SM decoder is high. Further, the complexity of SM decoder normally grows exponentially as a function of the number of transmit chains and receive chains. Therefore, it is crucial to solve the system of equations represented by EQ. 9 in an efficient manner so that the wireless communication system can operate in real time with less processing resources and consumes less power.

There are different optimal and sub-optimal decoders described in the literature to solve the system of equations represented by EQ. 9. The Maximum Likelihood Decoder (MLD) is an optimal decoder for SM. Although MLD provides, theoretically, a best achievable decoding performance, its complexity and processing requirements are normally very high even for the common wireless communication systems such as 2×2 or 4×4 SM-MIMO with 16-QAM or 64-QAM.

QR Decomposition (QRD) in conjunction with M-algorithm, referred as QRD-M decoder, is one of the commonly used sub-optimal SM decoders. A QRD-M sub-optimal SM decoder provides decoding performance close to that of the optimal SM decoder such as MLD, but requires reduced complexity and processing requirements. The reduced complexity and reduced processing requirements of QRD-M sub-optimal SM decoder makes it better suited for practical implementation. The QRD-M decoder used for SM is referred herein as a QRD-M SM decoder.

SUMMARY OF THE INVENTION

Certain wireless communication systems employ MIMO transmission and reception schemes to increase performance and the data rate of the system. As noted above, Spatial Multiplexing may be employed in MIMO systems to increase the data rate of the communication system by transmitting multiple data symbols on different antennae at the same time on the same frequency. The complexity of decoding spatially multiplexed signals using the optimal Maximum Likelihood (ML) algorithm is generally very high and therefore the throughput is often limited by the processing capability of the receiver. The QR Decomposition with M-algorithm (QRD-M method) may be used for reduced complexity implementation of the SM-MIMO decoder. One of the disadvantages of the conventional QRD-M method is that the M-algorithm process is sequential when processing signals from multiple antennas. Also, the number of distance metrics computations is lower compared to the ML algorithm but still is fairly high. In addition, the QRD-M method requires search for the M best distance metrics at each processing stage. A new approach for an SM-MIMO decoder that reduces the search and sorting operations is described herein. The approach uses a pre-computed list of nearest neighbors for a given modulation constellation geometry to reduce the search and sort operations. Conventional sorting operations may generally be difficult to parallelize, which could lead to increased latency in processing. The approach disclosed herein provides a low and deterministic latency with reduced complexity decoder for SM-MIMO systems.

Although the sub-optimal decoders are less complex and require less processing when compared to the optimal decoders, the complexity of the sub-optimal decoders still remain high. Therefore, it is desirable to further reduce the complexity of the sub-optimal decoders. Reduction in complexity results in less resource requirements and reduced power consumption. Since the decoding operations are performed at a very high rate such as millions of times per second, any reduction in processing requirements leads to significant reduction in power consumption, latency and/or increase in throughput. This, in turn, leads to more efficient resource use in users' portable wireless communication devices, such as those shown in FIGS. 2-4.

In accordance with one aspect of the invention, a method of decoding spatially multiplexed signals received by a wireless device is provided. The method comprises receiving, using two or more receive chains, a plurality of symbols from a transmitting device; deriving, using one or more processing devices, an estimated channel matrix H from the plurality of received symbols; decomposing, using the one or more processing devices, the estimated channel matrix H into a unitary matrix Q and a triangular matrix R; generating, using the one or more processing devices, a distance for each constellation point in a predetermined set of L constellation points from the Q and R matrices; deriving, using the one or more processing devices, an index corresponding to the constellation point having a minimum distance; identifying, using the one or more processing devices, a list of M−1 nearest neighbors corresponding to the derived index, wherein M identifies a number of candidate neighbor symbol sequences; determining by the one or more processing devices, using the list of M−1 candidate neighbors, distances for all L*M pairs of constellation point vectors; identifying, using the one or more processing devices, the index of the constellation point pair corresponding to the minimum distance; determining, using the one or more processing devices, distances for the L*M pairs of constellation point vectors for a predetermined length of symbol sequences; and selecting, using the one or more processing devices, the constellation point vector corresponding to the minimum distance as a decoded vector to identify a given one of the plurality of received symbols.

In one example, each distance corresponds to a distance metric, and wherein determining a minimum distance metric among K distance metrics requires K−1 comparisons. In this case, the method may further comprise pipelining the comparisons so that after each distance metric is determined that distance metric is compared against a current minimum distance metric.

In another example, the set of L constellation points in a constellation are associated with a constellation point geometry, and the value of M is specifically selected for each symbol sequence of the constellation. In one case, for a given constellation geometry, the number of candidate neighbor symbol sequences differs depending on a location of a corresponding symbol sequence in the constellation. In another case the candidate neighbor symbol sequences that are located at corners in the constellation have a fewer number of nearest neighbor symbol sequences than other candidate neighbor symbol sequences. In a further case, the candidate neighbor symbol sequences that are located at edges but not corners in the constellation have a greater number of nearest neighbor symbol sequences when compared to candidate neighbor symbol sequences located at the corners. And in yet another case, candidate neighbor symbol sequences not located at edges or corners in the constellation have a greater number of nearest neighbor symbol sequences when compared to candidate neighbor symbol sequences that are located at the corners and at the edges of the constellation.

And in a further example, the value of M is dynamically chosen based on a location of given one of the candidate neighbor symbol sequences corresponding to the minimum distance.

In accordance with another aspect of the invention, a wireless receiver apparatus is configured to decode spatially multiplexed signals. The apparatus comprises a plurality of receive chains configured to receive spatially multiplexed signals including a plurality of symbols from a transmitting device, and one or more processing devices operatively coupled to the plurality of receive chains. The one or more processing devices are configured to derive an estimated channel matrix H from the plurality of received symbols; decompose the estimated channel matrix H into a unitary matrix Q and a triangular matrix R; generate a distance for each constellation point in a predetermined set of L constellation points from the Q and R matrices; derive an index corresponding to the constellation point having a minimum distance; identify a list of M−1 nearest neighbors corresponding to the derived index, wherein M identifies a number of candidate neighbor symbol sequences; determine using the list of M−1 candidate neighbors, distances for all L*M pairs of constellation point vectors; identify the index of the constellation point pair corresponding to the minimum distance; determine distances for the L*M pairs of constellation point vectors for a predetermined length of symbol sequences; and select the constellation point vector corresponding to the minimum distance as a decoded vector to identify a given one of the plurality of received symbols.

In one example, the set of L constellation points in a constellation are associated with a constellation point geometry, and the value of M is selected by the one or more processing devices for each symbol sequence of the constellation. In one case, for a given constellation geometry, the number of candidate neighbor symbol sequences differs depending on a location of a corresponding symbol sequence in the constellation. In another case, the candidate neighbor symbol sequences that are located at corners in the constellation have a fewer number of nearest neighbor symbol sequences than other candidate neighbor symbol sequences. In a further case, the candidate neighbor symbol sequences that are located at edges but not corners in the constellation have a greater number of nearest neighbor symbol sequences when compared to candidate neighbor symbol sequences located at the corners. And in yet another case, candidate neighbor symbol sequences not located at edges or corners in the constellation have a greater number of nearest neighbor symbol sequences when compared to candidate neighbor symbol sequences that are located at the corners and at the edges of the constellation.

In another example, the value of M is dynamically chosen by the one or more processing devices based on a location of given one of the candidate neighbor symbol sequences corresponding to the minimum distance.

According to a further aspect of the invention, a non-transitory recording medium is provided that stores instructions thereon. The instructions, when executed by one or more processing devices, cause the one or more processing devices to execute a method of decoding spatially multiplexed signals received by a wireless device. The method comprises receiving, using two or more receive chains, a plurality of symbols from a transmitting device; deriving, using one or more processing devices, an estimated channel matrix H from the plurality of received symbols; decomposing, using the one or more processing devices, the estimated channel matrix H into a unitary matrix Q and a triangular matrix R; generating, using the one or more processing devices, a distance for each constellation point in a predetermined set of L constellation points from the Q and R matrices; deriving, using the one or more processing devices, an index corresponding to the constellation point having a minimum distance; identifying, using the one or more processing devices, a list of M−1 nearest neighbors corresponding to the derived index, wherein M identifies a number of candidate neighbor symbol sequences; determining by the one or more processing devices, using the list of M−1 candidate neighbors, distances for all L*M pairs of constellation point vectors; identifying, using the one or more processing devices, the index of the constellation point pair corresponding to the minimum distance; determining, using the one or more processing devices, distances for the L*M pairs of constellation point vectors for a predetermined length of symbol sequences; and selecting, using the one or more processing devices, the constellation point vector corresponding to the minimum distance as a decoded vector to identify a given one of the plurality of received symbols.

In one example, each distance corresponds to a distance metric, and determining a minimum distance metric among K distance metrics requires K−1 comparisons. Here, the method further comprises pipelining the comparisons so that after each distance metric is determined that distance metric is compared against a current minimum distance metric.

In another example, the set of L constellation points in a constellation are associated with a constellation point geometry, and the value of M is specifically selected for each symbol sequence of the constellation. And in a further example, the value of M is dynamically chosen based on a location of given one of the candidate neighbor symbol sequences corresponding to the minimum distance.

BRIEF DESCRIPTION OF THE DRAWINGS

FIG. 9 illustrates the constellation of 64-QAM, which may be employed with aspects of the invention described herein.

FIG. 14 illustrates an example lookup table used for determining nearest neighbors for first stage processing in case of 16QAM, in accordance with aspects of the invention.

FIG. 15 illustrates an example lookup table used for determining nearest neighbors for second stage processing in case of 16QAM, in accordance with aspects of the invention.

FIG. 16 illustrates an example of a first level of nearest neighbor points for one of the points of a 64QAM constellation.

FIG. 17 illustrates an example lookup table used for determining nearest neighbors for first stage processing in case of 64QAM, in accordance with aspects of the invention.

DETAILED DESCRIPTION

The present invention describes a method and apparatus to reduce the complexity and latency of the QRD-M SM decoder. To describe the invention, the conventional QRD-M SM decoder is briefly described next.

Figure 10:
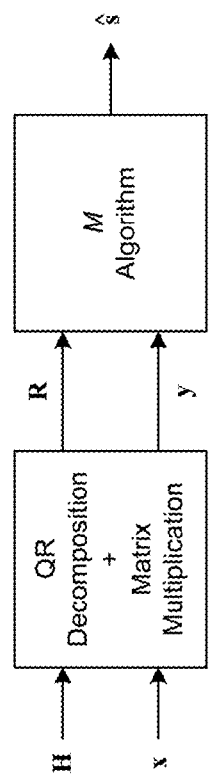
FIG. 10 illustrates a QRD-M SM decoder.

The conventional QRD-M SM decoder consists of two main processing blocks as shown in FIG. 10. The first main processing block is the QR decomposition and matrix multiplication and the second main processing block is the M-algorithm.

The QR decomposition block decomposes the channel matrix H into a right triangular matrix R and a unitary matrix Q using the QR matrix decomposition method. Specifically, $$H=QR \tag{10}$$

Since R is a right triangular matrix, all its elements below the main diagonal are zero. A property of a unitary matrix is that its inverse can be obtained by its Hermitian transpose. Specifically, $$Q^{-1}=Q^H \tag{11}$$

Therefore, $$Q^H Q=I \tag{12}$$

where I is an identity matrix. The Hermitian transpose of a unitary matrix is also a unitary matrix. Also when a vector is multiplied by a unitary matrix, the magnitude of the vector does not change. Substituting H from EQ. 10 in the expression for the received signal vector represented by EQ. 9:

$$x=QRs+n \tag{13}$$

Pre-multiplying both sides with $Q^H$, $$Q^H x=y=Q^H QRs+Q^H n=Rs+w \tag{14}$$

where y is the rotated received signal vector x and w is the rotated noise vector n. EQ. 14 becomes $$y=Rs+w \tag{15}$$

For the case of 4×4 SM-MIMO, the expanded version of EQ. 15 is as follows:

$$\begin{bmatrix} y_0 \\ y_1 \\ y_2 \\ y_3 \end{bmatrix} = \begin{bmatrix} r_{0,0} & r_{1,0} & r_{2,0} & r_{3,0} \\ 0 & r_{1,1} & r_{2,1} & r_{3,1} \\ 0 & 0 & r_{2,2} & r_{3,2} \\ 0 & 0 & 0 & r_{3,3} \end{bmatrix} \begin{bmatrix} s_0 \\ s_1 \\ s_2 \\ s_3 \end{bmatrix} + \begin{bmatrix} w_0 \\ w_1 \\ w_2 \\ w_3 \end{bmatrix} \tag{16}$$

In case the number of receive chains at the receive entity is greater than the number of transmit chains at the transmit entity, all the elements in the bottom $N_r-N_t$ rows of the right triangular matrix R are zero and the bottom $N_r-N_t$ rows of the column vector y are also zero after QR decomposition. Therefore, the system of equations represented by EQ. 15 is simplified to an $N_t \times N_t$ system of linear equations. In the remainder of this disclosure, the R matrix is simply considered to be an $N_t \times N_t$ matrix.

The second main processing block of the QRD-M SM decoder, namely the M-algorithm, is described next. The solution of the system of equations represented in EQ. 15 using the M-algorithm may be obtained in several stages. The number of stages in the M-algorithm corresponds to the number of rows in the system of equations and the algorithm is applied sequentially to each stage. The value of M in the M-algorithm refers to the number of "best candidates" used for further consideration in a sequential decoding process. The best candidates are the symbols from the constellation selected based on minimum distance metrics. The M-algorithm for each stage includes two major processing steps. First, it computes all the distance metrics for a given stage. Next it selects M best candidates for the next stage of processing. The selected M best candidates are referred as "surviving symbol sequences" for the next stage. This process continues for all stages and at the last stage one best candidate is selected as the decoded symbols vector ŝ.

A 4×4 SM-MIMO wireless communication system, as represented in EQ. 16, using 16-QAM modulation is chosen to illustrate the M-algorithm. For the chosen example, as represented in EQ. 16, the number of stages for M-algorithm is four. In QRD-M SM decoder, the M-algorithm starts by first operating on the bottom-most row corresponding to a single non-zero element in the R matrix. For the chosen example, as represented in EQ. 16, the M-algorithm starts with the fourth row containing the single non-zero element $r_{3,3}$ in matrix R.

To solve the equation represented by the bottom-most row containing a single non zero element, all possible values for $s_{(N_t-1)}$ from the constellation alphabet A used by the transmit entity may be multiplied with element $r_{(N_t-1),(N_t-1)}$ of matrix R and subtracted from element $y_{(N_t-1)}$ of vector y to compute the distance metrics $d_{(N_t-1)}$ for all possible values of $s_{(N_t-1)}$. For the chosen example, as represented in EQ. 16, to solve the equation represented by the fourth row containing a single non zero element $r_{3,3}$, all possible values for $s_3$ from the constellation alphabet A used by the transmit entity may be multiplied with $r_{3,3}$ and subtracted from $y_3$ to compute the distance metrics $d_3$ for all possible values of $s_3$. For the chosen example, as represented in EQ. 16, with 16-QAM modulation used by the transmit entity, the number of distance metric computations at the receive entity for the fourth row is 16, corresponding to 16 possible values for $s_3$.

For the chosen example, as represented in EQ. 16, M=8 is used for the M-algorithm. For the chosen example, as represented in EQ. 16, this leads to the selection of 8 best symbols with minimum distance metrics from the total of 16 distance metrics corresponding to L=16 symbols. These selected 8 (M=8) symbols are referred as surviving symbol sequences. At the first stage the symbol sequences contain one symbol and at the subsequent stages the symbol sequences grow by one symbol in length at each stage as the stages progress.

Next, the M-algorithm enters the second stage of processing. In the second stage of processing, the M-algorithm operates on row ($N_t-2$). For the chosen example, as represented in EQ. 16, the M-algorithm operates on the third row which is immediately above the fourth row. At the second stage of M-algorithm, there are 16 possible values for $s_2$ and 8 selected surviving symbol sequences from the previous stage. This requires 16×8=128 total number of distance metric computations corresponding to 128 different combinations of $s_2$ and $s_3$. The distance metrics computed in the second stage are cumulative distance metrics corresponding to the distance metric of a symbol sequence ($s_2$, $s_3$) and the distance metric of the selected surviving symbol for $s_3$ during the first stage. The M-algorithm then selects 8 best surviving symbol sequences corresponding to the minimum cumulative distance metrics. The surviving symbol sequences are of length two at this stage.

Next, the M-algorithm enters the third stage of processing. In the third stage of processing, the M-algorithm operates on row ($N_r$−3). For the chosen example, as represented in EQ. 16, the M-algorithm operates on the second row which is immediately above the third row. At the third stage of the M-algorithm, there are 16 possible values for $s_1$ and 8 selected surviving symbol sequences from previous stage. This requires 16×8=128 total number of distance metric computations corresponding to 128 different combinations of $s_1$, $s_2$ and $s_3$. The distance metrics computed in the third stage are the cumulative distance metrics corresponding to the distance metric of a symbol sequence ($s_1$, $s_2$, $s_3$) and the distance metric of the selected surviving symbol sequence for ($s_2$, $s_3$) during the second stage. Next, the M-algorithm selects 8 best surviving symbol sequences corresponding to the minimum cumulative distance metrics.

Figure 11:
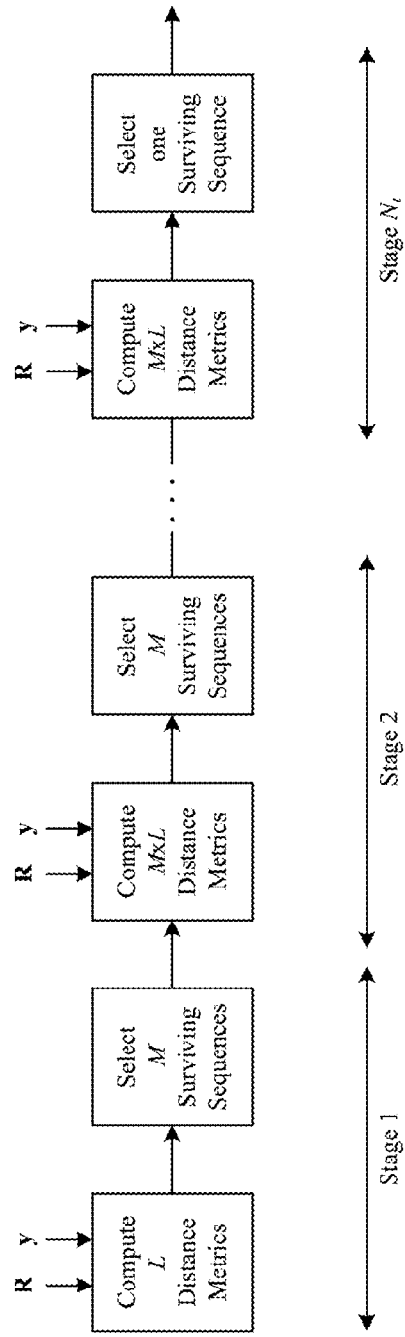
FIG. 11 illustrates the general processing flow diagram of the M-algorithm.

This process continues for each stage until the last stage, which corresponds to the first row of EQ. 15, is reached. After computing the cumulative distance metrics for the last stage, one best surviving symbol sequence is selected as the decoded symbols vector $\hat{s}$. For the chosen example, as represented in EQ. 16, at the last stage the M-algorithm operates on the first row. Therefore, at the last stage of the M-algorithm, there are 16 possible values for $s_0$ and 8 selected surviving symbol sequences from previous stage. This requires 16×8=128 total number of distance metric computations corresponding to 128 different combinations of $s_0$, $s_1$, $s_2$ and $s_3$. The distance metrics computed in the last stage are the cumulative distance metrics corresponding to the distance metric of a symbol sequence ($s_0$, $s_1$, $s_2$, $s_3$) and the distance metric of the selected surviving symbol sequence ($s_1$, $s_2$, $s_3$) during the third stage. Next, the M-algorithm selects one best surviving symbol sequence $\hat{s}=[\hat{s}_0, \hat{s}_1, \hat{s}_2, \hat{s}_3]^T$ corresponding to the minimum cumulative distance metric. FIG. 11 shows the general processing flow diagram of the M-algorithm for $N_t$ stages.

The value of M may be chosen according to the required decoding performance and processing complexity tradeoff. The smaller the value of M, the lesser the complexity and processing requirements, which leads to reduction in power consumption. However, a smaller value of M also reduces the decoding performance.

Two major areas of complexity in the M-algorithm for each stage are: the computation of distance metrics and selection of best surviving symbol sequences corresponding to the minimum distance metrics. The computation of distance metrics in general may require complex multiplications. Since there may be hundreds of distance computations for one pass of QRD-M SM decoder, the number of required complex multiplications is generally high. Although the complexity of the computation of distance metrics is high, it may be pipelined and/or parallelized in a VLSI implementation to reduce latency. However, the operation to select M best surviving symbol sequences involves extensive memory access, conditional branching, element swapping, and so forth depending on the ordering feature of the input sequences and therefore the operation to select M best surviving symbol sequences may be difficult to pipeline and/or parallelize. Therefore, the processing latency of the QRD-M SM decoder normally depends on the processing latency of the operation that selects the M best surviving symbol sequences.

In general, when using an $N_t \times N_r$ SM-MIMO wireless communication system, there will be $N_t$ processing stages in a QRD-M SM decoder. If a modulation scheme with constellation size L is used by the transmit entity, then the following selection operations may be performed based on minimum distance metrics:

For the first stage: M surviving symbol sequences out of L symbol sequences.

For each intermediate stage: M surviving symbol sequences out of M×L symbol sequences For the last stage: one surviving symbol sequence out of M×L symbol sequences.

For the chosen example of 4×4 MIMO as represented in EQ. 16 with 16-QAM, the following selection operations are performed for M=8 based on minimum distance metrics:

For the first stage: 8 surviving symbol sequences out of 16 symbol sequences.

For the second stage: 8 surviving symbol sequences out of 8×16=128 symbol sequences.

For the third stage: 8 surviving symbol sequences out of 8×16=128 symbol sequences.

For the last stage: one surviving symbol sequence out of 8×16=128 symbol sequences.

There are several traditional methods that may be used to select the best surviving symbol sequences:

Method I: The "Quicksort" sorting method has average processing complexity in the order of (K×log$_2$ K) operations for sorting a list of K symbol sequences. For the chosen example, as represented in EQ. 16, K=128 for second and third stages. Using the Quicksort sorting method, the number of operations to select 8 best surviving symbol sequences out of 128 symbol sequences is equal to 128×7=896 operations.

Method II: In the conventional M-algorithm, there is no need to sort all the symbol sequences in the list of all the possible symbol sequences. Only M symbol sequences with smallest distance metrics may be selected out of a total K symbol sequences. This can be achieved with a "Partial Quicksort" sorting method, where fewer operations are required when compared to the Quicksort sorting method which performs full sorting. The Partial Quicksort sorting method has an average processing complexity in the order of (K+M×log$_2$ K) operations for selecting M symbol sequences from a list of K symbol sequences. For the chosen example, as represented in EQ. 16, K=128 for second and third stages. Using the Partial Quicksort sorting method, the number of operations to select 8 best surviving symbol sequences out of 128 symbol sequences is equal to 128+8×3=152 operations.

Method III: In the conventional M-algorithm, there is no need to sort even the M surviving symbol sequences. Hence the required number of operations may be further reduced when compared to the Partial Quicksort sorting method. This reduces the required number of operations to K for a list of K symbol sequences. For the chosen example, as represented in EQ. 16, K=128 for second and third stages. Using this method, the number of operations to select 8 best surviving symbol sequences out of 128 symbol sequences is equal to 128 operations.

As can be observed, among the three traditional sorting methods used to select the best surviving symbol sequences, Method III requires the least number of operations. Although Method III requires the least number of operations, each operation actually involves several memory reads, memory writes, comparisons, etc. On the other hand, the latency of Method I and Method II is not deterministic, i.e., the average number of operations and the worst case number of operations may vary considerably. For the case of higher order modulation such as 64-QAM, the number of operations for the selection of surviving symbol sequences may be even higher since the total number of symbol sequences in the list grows significantly. This significantly increases the complexity and the processing latency of the QRD-M SM decoder. Therefore, it is desirable to reduce the processing latency of the selection of surviving symbol sequences in order to reduce the overall processing latency of the QRD-M SM decoder. However, the operation to select M best surviving symbol sequences involves extensive memory access, conditional branching, element swapping, and so forth depending on the ordering feature of the input sequence and therefore the operation to select M best surviving symbol sequences may be difficult to pipeline and/or to parallelize.

Aspects of the invention described herein provide a method and apparatus to achieve decoding performance close to that of the conventional M-algorithm but with reduced processing requirements and processing latency. This may significantly simplify the implementation of a QRD-M SM decoder and results in lower processing latency and reduced power consumption. These can be substantial advantages for portable wireless communication devices such as a cellular phone, laptop, netbook, etc.

This improved and more efficient processing may be performed by one or more DSPs, microcontrollers, hardware accelerators, co-processors or a combination of any of such processing devices, which receive signals from multiple receive chains. This may be done in conjunction with internal memory, including a stack or buffer memory, with external memory, or both. The results of the processor-generated determination are used to decoding spatially multiplexed signals in a MIMO wireless communication systems and to provide efficient communication between the receiving device and other devices.

According to an aspect of the present invention, at each stage of the new M-algorithm a minimum of all the distance metrics is selected and the rest of the M−1 surviving symbol sequences are selected from a look-up table. This is described herein as the "Lookup Table M-Algorithm Process" or the "Lookup Table Process."

According to another aspect of the present invention, the choice of the number of surviving symbol sequences at each stage may be optimized according to the geometry of the constellation under consideration such as 16-QAM or 64-QAM. Multiple equidistance neighbor symbols may be present for a given symbol in a constellation.

Figure 12:
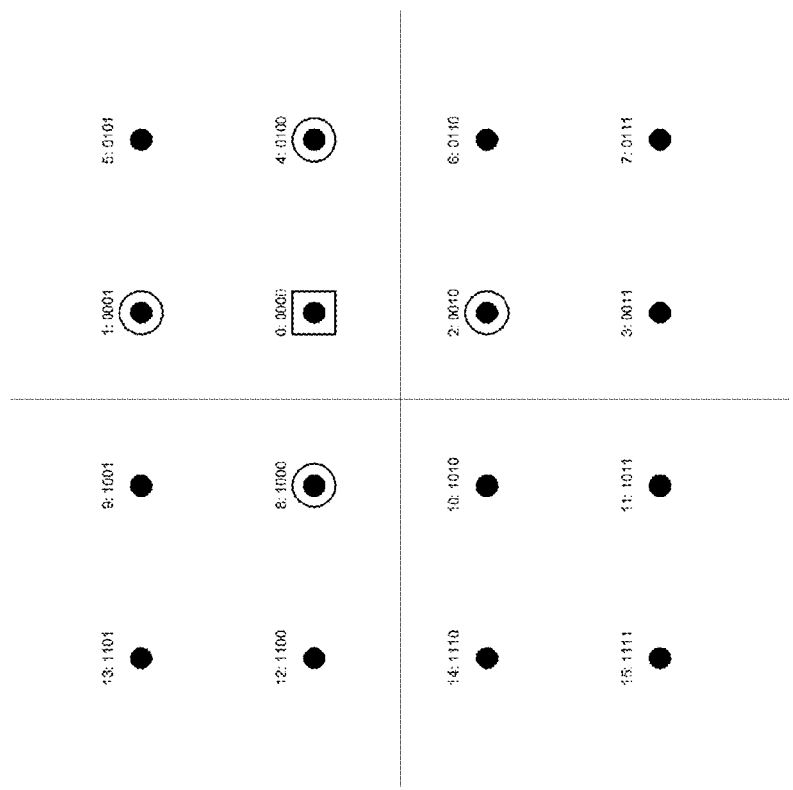
FIG. 12 illustrates an example of a first level of nearest neighbor points for one of the points of a 16-QAM constellation.
Figure 13:
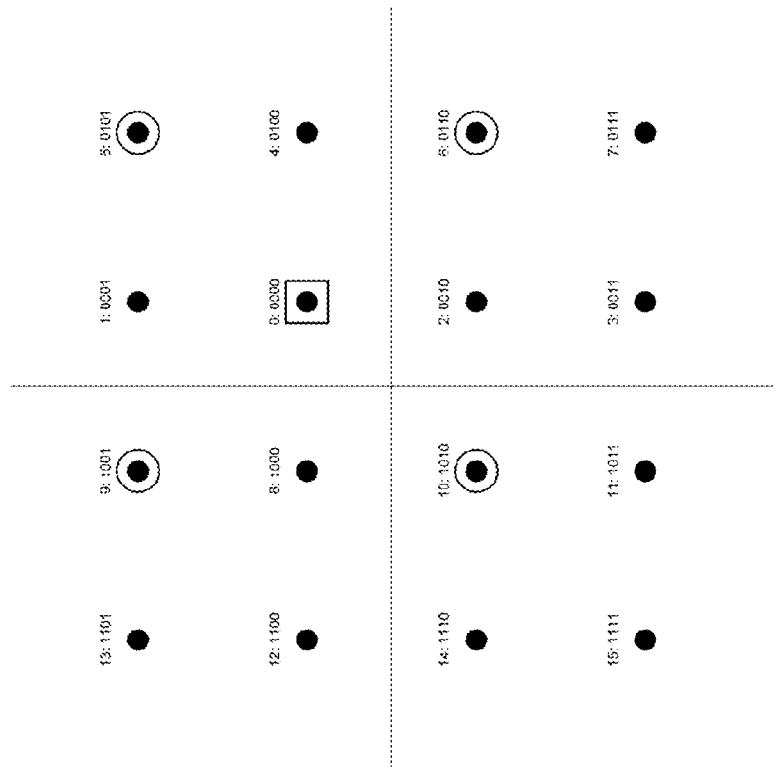
FIG. 13 illustrates an example of a second level of nearest neighbor points for one of the points of a 16-QAM constellation.

As shown in the example 16-QAM constellation of FIG. 12, there are four nearest neighbors at equidistance for symbol 0, identified by a square around the point, namely symbols 1, 2, 4 and 8 which are identified by circle around the points. Again for symbol 0, the next nearest neighbors at slightly greater distance than the first four neighbors are also at equidistance from symbol 0, identified by a square around the point, namely symbols 5, 6, 9 and 10 which are identified by circle around the points as shown in FIG. 13.

On the other hand, for symbol 4, there are three nearest neighbors at equidistance, namely symbols 0, 5 and 6. Again for symbol 4, the next nearest neighbors at slightly greater distance than the first three neighbors are also at equidistance from symbol 4, namely symbols 1 and 2.

For symbol 5, there are two nearest neighbors at equidistance, namely symbols 1 and 4. Again for symbol 5, the next nearest neighbor at slightly greater distance than the first two neighbors, namely symbol 0.

Figure 8:
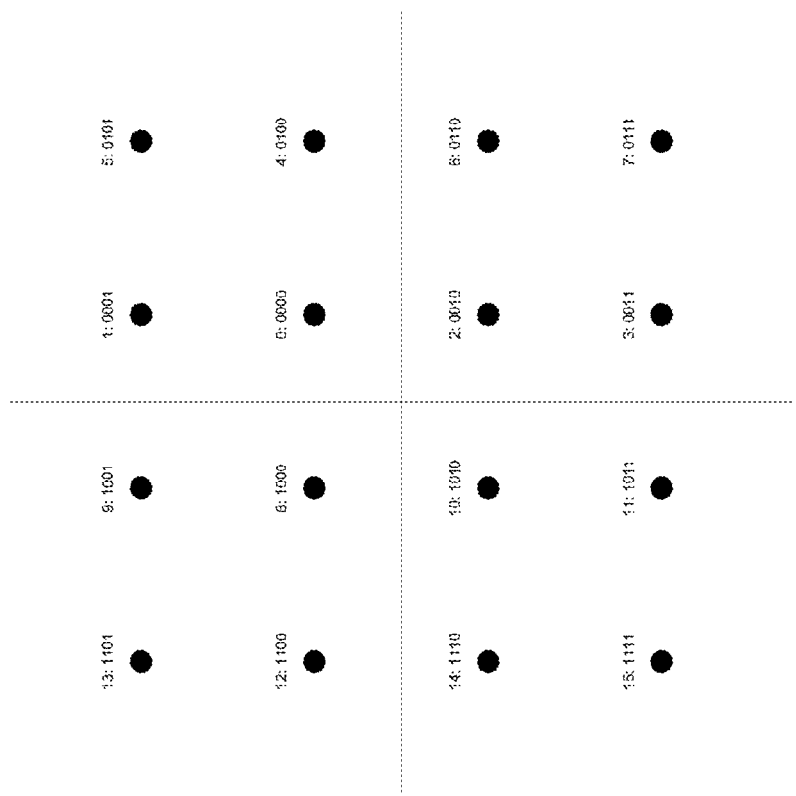
FIG. 8 illustrates the constellation of 16-QAM, which may be employed with aspects of the invention described herein.

Therefore, it is optimum to select the number of surviving symbol sequences that are related to the set of nearest neighbors for a given symbol. For a 16-QAM constellation as shown in FIG. 8, the preferred values for M considering the geometry of the constellation may be 5 for a lower complexity implementation and may be 9 for a higher complexity implementation.

For each stage of the Lookup Table Process, a minimum of all the distance metrics and the symbol sequence corresponding to that minimum distance metric is determined. The symbol sequence corresponding to the minimum is used to lookup the remaining M−1 surviving symbol sequences from the pre-computed lookup table. The lookup table may be maintained in buffer memory. These M−1 surviving symbol sequences and the symbol sequence corresponding to the minimum distance are used as the surviving symbol sequences for the next stage of processing. However, for the last stage of the Lookup Table Process, a minimum of all the distance metrics and the symbol sequence corresponding to that minimum distance metric is determined and it is the decoded symbols vector.

The first few stages of the Lookup Table Process for M=9 is illustrated for the chosen example, as represented in EQ. 16. For the first stage, the distance metric is computed for all 16 symbol sequences. Next the minimum of all the distance metrics is determined. For illustration purposes, the symbol sequence corresponding to the minimum distance metric is chosen to be symbol sequence 0. Now symbol sequence 0 is used to lookup the surviving symbol sequences from the surviving symbol sequence table contained in FIG. 14. The 8 ("M−1") surviving symbol sequences for symbol sequence 0 are symbol sequences 1, 4, 2, 8, 5, 6, 9 and 10. So the total M surviving symbol sequences for the next stage are symbol sequences 0, 1, 4, 2, 8, 5, 6, 9 and 10.

For the second stage, the distance metric is computed for all the 16×9=144 symbol sequences. Next the minimum of all the distance metrics is determined. For illustration purposes, the symbol sequence corresponding to the minimum distance metric is chosen to be symbol sequence $(s_2, s_3)=(0, 10)$. Now the symbol sequence (0, 10) is used to lookup the surviving symbol sequence table in FIG. 15. The 8 ("M−1") surviving symbol sequences for symbol sequence (0, 10) are symbol sequences (0, 11), (0, 14), (1, 10), (4, 10), (0, 2), (0, 8), (2, 10) and (8, 10). So the total M surviving symbol sequences for the next stage are symbol sequences (0, 10), (0, 11), (0, 14), (1, 10), (4, 10), (0, 2), (0, 8), (2, 10) and (8, 10). This process continues and at the end of the third stage there are nine surviving symbol sequences. At the end of the fourth stage one symbol sequence corresponding to the minimum distance metric is obtained and it is the decoded symbols vector.

Figure 9:
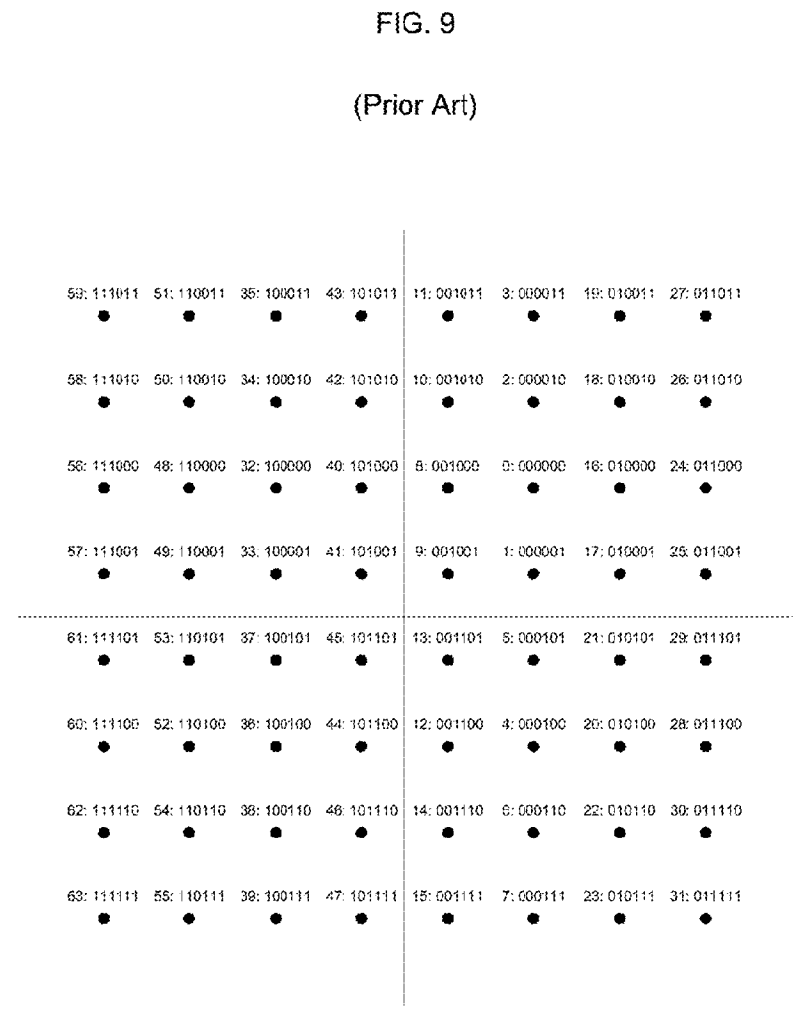
Figure 16:
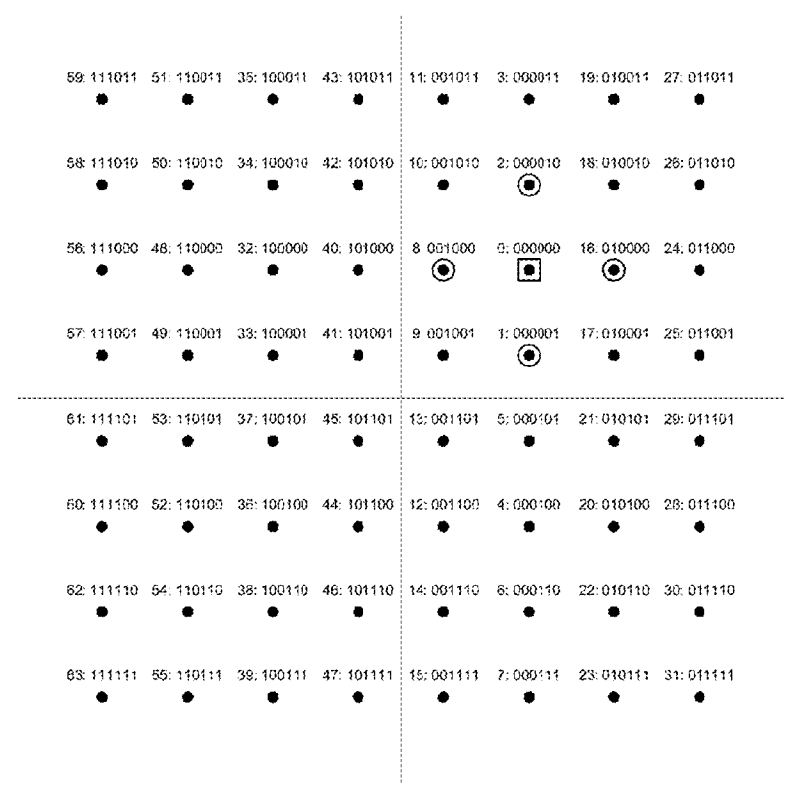
Figure 17:
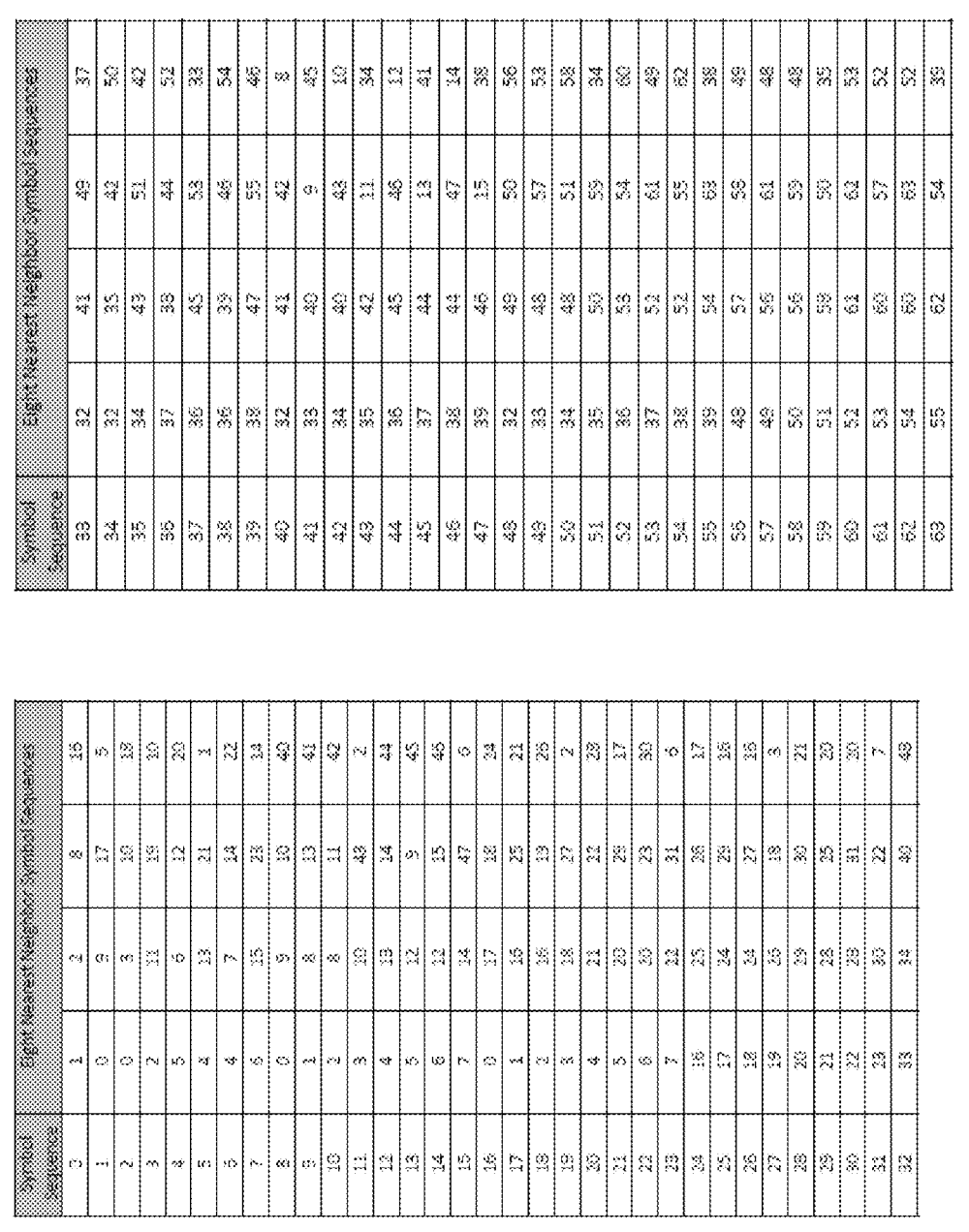

FIG. 9 shows the constellation for 64-QAM modulation. For symbol 0, the nearest neighbor symbols are 1, 2, 8 and 16 as shown in FIG. 16. The surviving symbol sequences lookup table for the first stage is shown in FIG. 17.

For the $p^{th}$ stage of the M algorithm there are LP possible symbol sequences. For each symbol sequence, M−1 nearest symbol sequences are pre-computed. The number of entries in the symbol sequence lookup tables comprises $L^p \times (M-1)$ symbol sequences. The length of a symbol sequence for the $p^{th}$ stage is p symbols and each symbol is $\log_2 L$ bits. Therefore, each symbol sequence can be represented by $p \times \log_2 L$ bits. FIG. 14 shows the symbol sequence lookup table for the first stage of the chosen example, as represented in EQ. 16.

Figure 19:
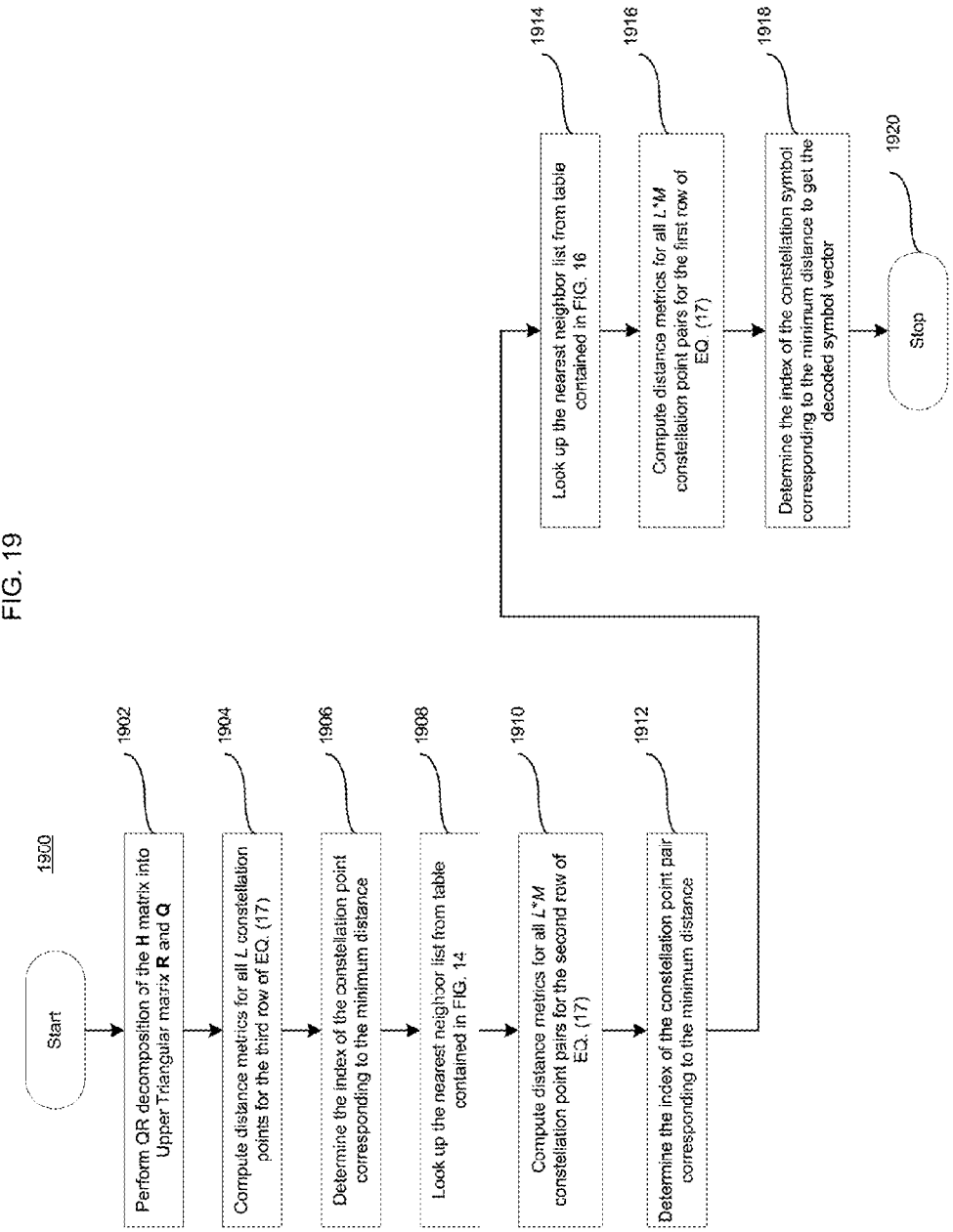
FIG. 19 illustrates the processing flow diagram of the Lookup Table M-algorithm Process in accordance with aspects of the present invention.

The overall processing flow for the Lookup Table Process as applied to a 3×3 MIMO communication system using 16-QAM is as per the flowchart 1900 contained in FIG. 19. Unless expressly stated herein or constrained by prior operations, the processing stages may be performed in a different order or concurrently. For the case of 3×3 SM-MIMO, the expanded version of EQ. 15 is as follows:

$$\begin{bmatrix} y_0 \\ y_1 \\ y_2 \end{bmatrix} = \begin{bmatrix} r_{0,0} & r_{1,0} & r_{2,0} \\ 0 & r_{1,1} & r_{2,1} \\ 0 & 0 & r_{2,2} \end{bmatrix} \begin{bmatrix} s_0 \\ s_1 \\ s_2 \end{bmatrix} + \begin{bmatrix} w_0 \\ w_1 \\ w_2 \end{bmatrix} \quad (17)$$

The processing begins at stage 1902 by first performing the decomposition of the estimated channel matrix into Q and R matrices. Next one row of EQ. (17) is processed at a time to find the decoded vector. The processing at stage 1904 begins by computing the distances for all L constellation points for third row of EQ. (17). Next the index corresponding to the minimum distance is determined at processing stage 1906. At processing stage 1908 the table contained in FIG. 14 is used to look up the M−1 nearest neighbors corresponding to the index selected in processing stage 1906. At processing stage 1910 the second row of EQ. (17) is used to plug-in the value of constellation points obtained from the processing stage 1908 to compute the distances for all L*M pairs of constellation points. At processing stage 1912 the index of the constellation point pair corresponding to the minimum distance is determined. The selected index from processing stage 1912 is used to look up the list of constellation point pairs from FIG. 16 at processing stage 1914. Next the first row of EQ. (17) is used in processing stage 1916 to compute the distances for L*M combinations of constellation point vectors of three symbols each. Finally, at processing stage 1918 the index of the constellation point vector corresponding to the minimum distance is determined and the vector is declared as the decoded vector. The process preferable terminates at stage 1920. Each of these stages of the process may be implemented by one or more processors and memory as discussed above.

According to the present invention, the required number of operations to obtain M surviving symbol sequences by using for the Lookup Table M-algorithm is always deterministic at all stages for a given value of M.

In general, the search for a minimum distance metric among K distance metrics requires K−1 comparisons. However, these comparisons may be pipelined with the distance metric computation unit such that after each distance metric is computed it is compared against the current minimum distance metric. The minimum of the two distance metrics is stored as the new current minimum distance metric. When the minimum distance metric is stored, its corresponding symbol sequence index is also stored. This process is continued till all the distance metrics are computed. At the end of last distance metric computation, the final minimum is obtained and the index of the symbol sequence corresponding to the final minimum is used to lookup the surviving symbol sequence table for the surviving symbol sequences for the next stage. Therefore, when compared to the traditional method of selecting surviving symbol sequences, there is significantly reduced latency for selecting the surviving symbol sequences with the Lookup Table M-algorithm process.

In some implementations, the distance metric computations may be parallelized to improve the throughput and to reduce the processing latency and this may be achieved by having multiple distance metric computation units. At each processing instant, each distance metric computation unit generates one output and this results in multiple distance metric outputs at the same time. In this case, the minimum for each of the distance metric computation unit may be computed in the same pipelined manner described above. Finally, when all the distance metrics are generated, the local minima associated with each of the distance metric computation units are searched for the global minimum. For example, there may be four parallel distance metric computation units with separate minimum distance metric detection unit attached to them. At the end of all distance metric computations for a given stage, there are four separate local minima produced at each minimum distance metric detection unit. These four local minima can be searched for the global minimum using three comparison operations. After the global minimum is determined, the symbol sequence index corresponding to the global minimum is used to obtain the M−1 surviving symbol sequences from the pre-computed lookup tables. Therefore, when compared to the traditional method of selecting surviving symbol sequences, there is significantly reduced latency for selecting the surviving symbol sequences with the Lookup Table M-algorithm method.

Figure 18:
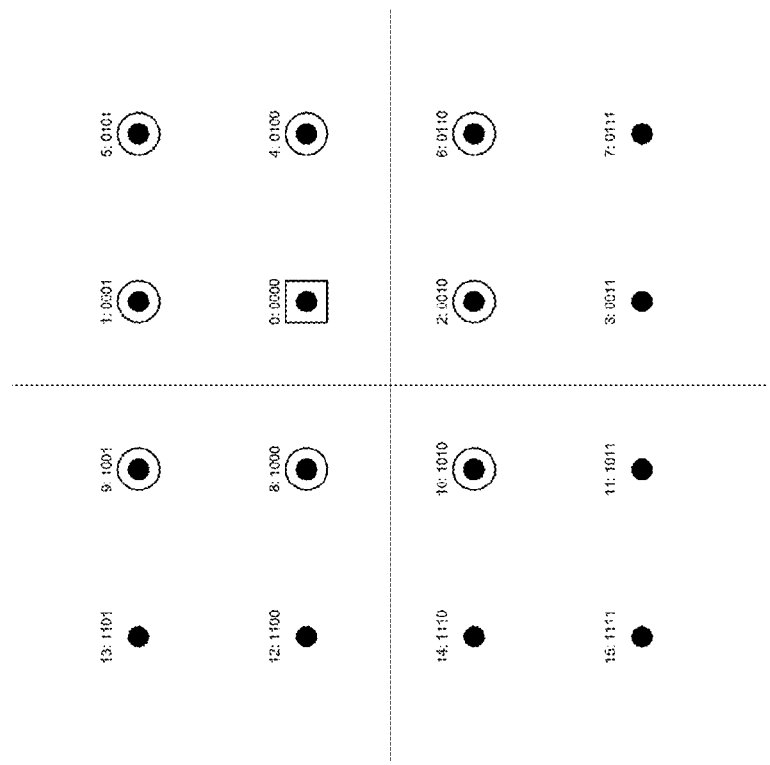
FIG. 18 illustrates an example of nearest neighbor points M=9 for one of the points of a 16-QAM constellation.

To further illustrate the new method, a case of 16-QAM with M=9 and 2×2 SM-MIMO configuration is considered. An example of 16-QAM constellation is shown in FIG. 8. The lookup table containing the surviving symbol sequences for each symbol sequence is pre-computed. An example of the nearest 8 surviving symbol sequences for symbol sequence 0 is illustrated in FIG. 18. For this case, there are 16×8 entries in the surviving symbol sequences lookup table for the first stage. After computing 16 distance metrics and determining the minimum distance metric, the corresponding surviving symbol sequences for the second stage are looked up from the pre-computed surviving symbol sequences lookup table as shown in table of FIG. 14 for the first stage. In the second stage, a total of 16×9=144 distance metric computations are performed. Finally a minimum of these 144 distance metrics is determined. For the 2×2 SM, the second stage is the last stage. The symbol sequence corresponding to the minimum accumulated distance is the decoded symbols vector.

In yet another aspect of the present invention, based on the constellation geometry, the value of M may be chosen specifically for each symbol sequence of the constellation. For a given constellation geometry, the number of nearest neighbor symbol sequences may be different depending on the location of the symbol sequence in the constellation. The symbol sequences that are located at the corners in the constellation may have fewer number of nearest neighbor symbol sequences. The symbol sequences that are located at the edges, but not at the corners, may have more number of nearest neighbor symbol sequences when compared to the symbol sequence that are located at the corners. Other symbol sequence in the constellation that are neither located at the corners and nor at the edges, may have more number of nearest neighbor symbol sequences when compared to those symbol sequences that are located at the corners and at the edges.

Figure 20:
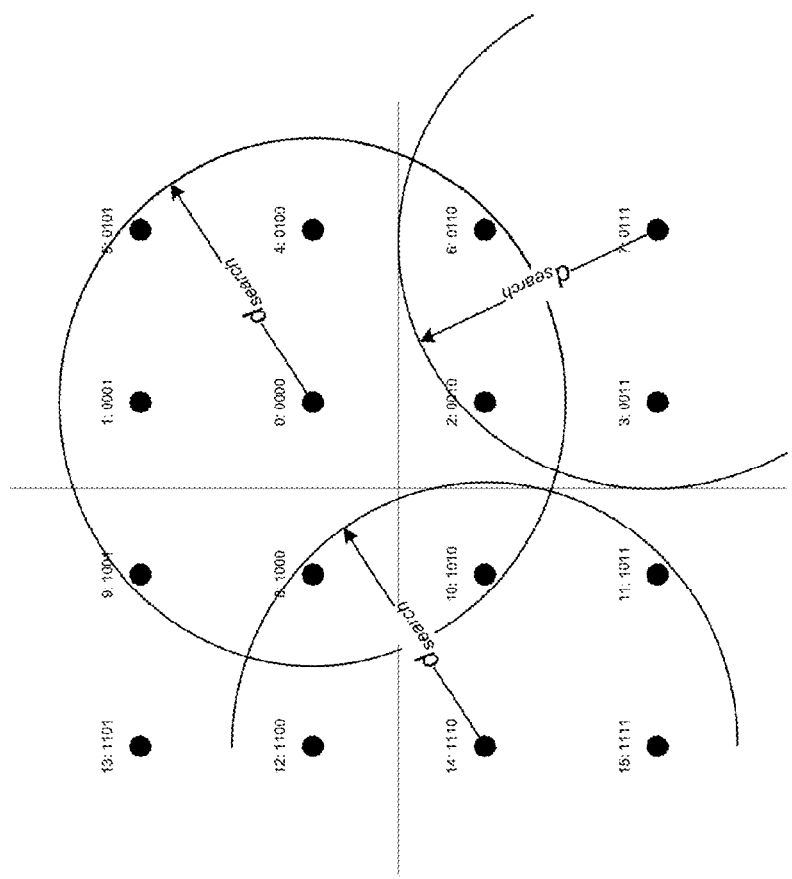
FIG. 20 illustrates an example nearest neighbor list selection according to specified search distance and location of constellation point for dynamic M nearest neighbor list for reduced average latency, in accordance with aspects of the present invention.

For example, in a 16-QAM constellation, symbols 0, 2, 8 and 10 are neither at the corner and nor at the edge of the constellation. For these symbols the number of nearest neighbor symbols within a specified distance $d_{search}$ is 8 symbols as shown in FIG. 20. The symbols 1, 3, 4, 6, 9, 11, 12, and 14 are located at the edges of the constellation but not at the corners. For these symbols, the number of nearest neighbor symbols within the same specified distance $d_{search}$ is 5 symbols as shown in FIG. 20. The symbols 5, 7, 13 and 15 are located at the corners of the constellation. For these symbols, the number of nearest neighbor symbols within the same specified distance $d_{search}$ is 3 symbols as shown in FIG. 20. The value of M may be dynamically chosen based on the location of the symbol sequence corresponding to the minimum distance metric at each stage. For example, if the symbol sequence corresponding to the minimum distance metric is symbol 0, 2, 8 or 10, M may be chosen to be 9 and if the symbol sequence corresponding to the minimum distance metric is symbol 1, 3, 4, 6, 9, 11, 12, or 14, M may be chosen to be 5 and if the symbol sequence corresponding to the minimum distance metric is symbol 5, 7, 13 or 15, M may be chosen to be 3.

For the case where the value M is chosen specifically for each symbol sequence in a constellation based on the location of the symbol sequence in a constellation, average complexity and processing of the minimum distance metric is further reduced. This further reduces the processing latency, improves the throughput and reduces the power consumption.

In the present invention the search and the selection operation required in the traditional QRD-M SM algorithm is replaced with minimum distance metric detection followed by the nearest symbol sequence lookup from the pre-computed surviving symbol sequences lookup tables. Furthermore, the search for the minimum distance metric may be pipelined with the distance metric computations. This reduces the processing latency for the selection of surviving symbol sequences to a maximum of few operations. This results in a significant reduction in processing latency for the QRD-M SM decoder and also leads to significant reduction in power consumption and/or increase in throughput. For lower order SM-MIMO configurations, for example 2×2, 2×3 or 2×4 SM-MIMO configurations, the gate count for a VLSI implementation is smaller when compared to the traditional QRD-M SM decoder. This advantage is in addition to the above mentioned reduced latency, reduced power consumption and/or increased throughput advantages.

Figure 1:
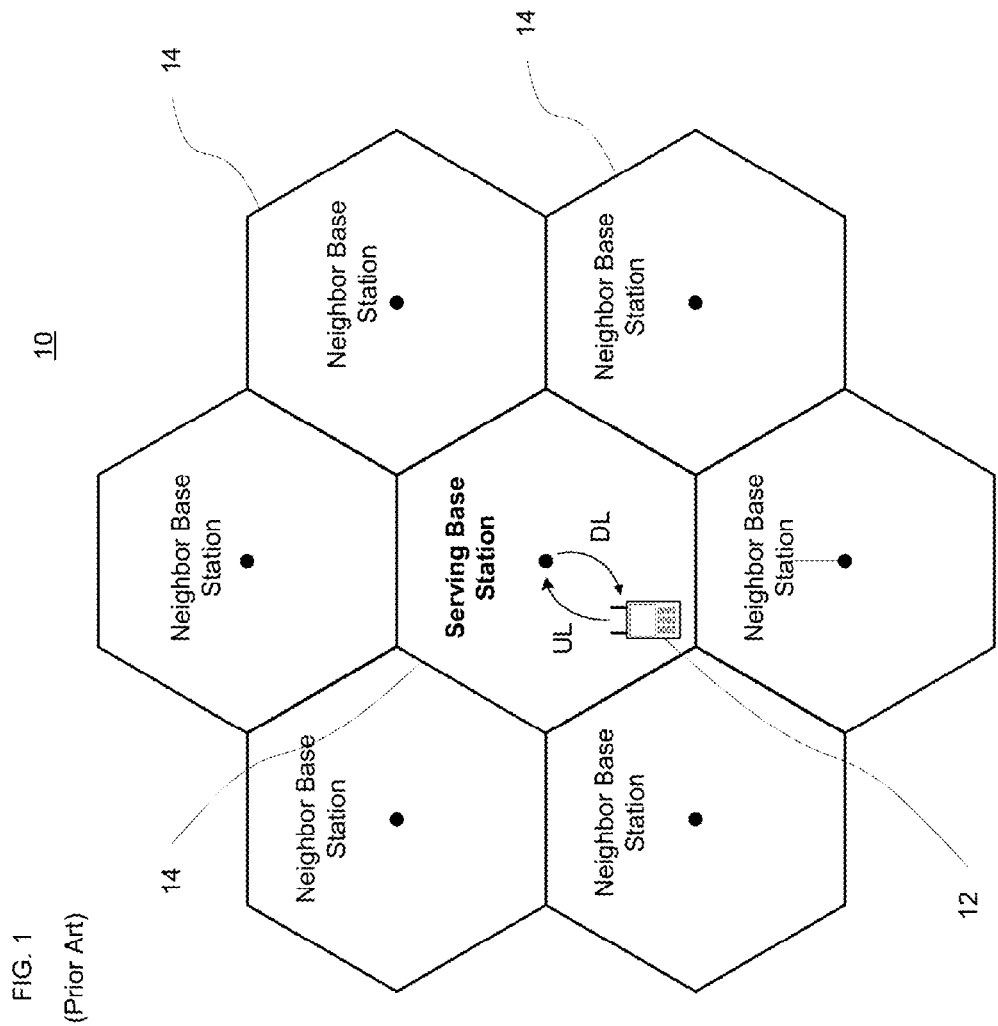
FIG. 1 illustrates a conventional mobile wireless communication system.
Figure 2:
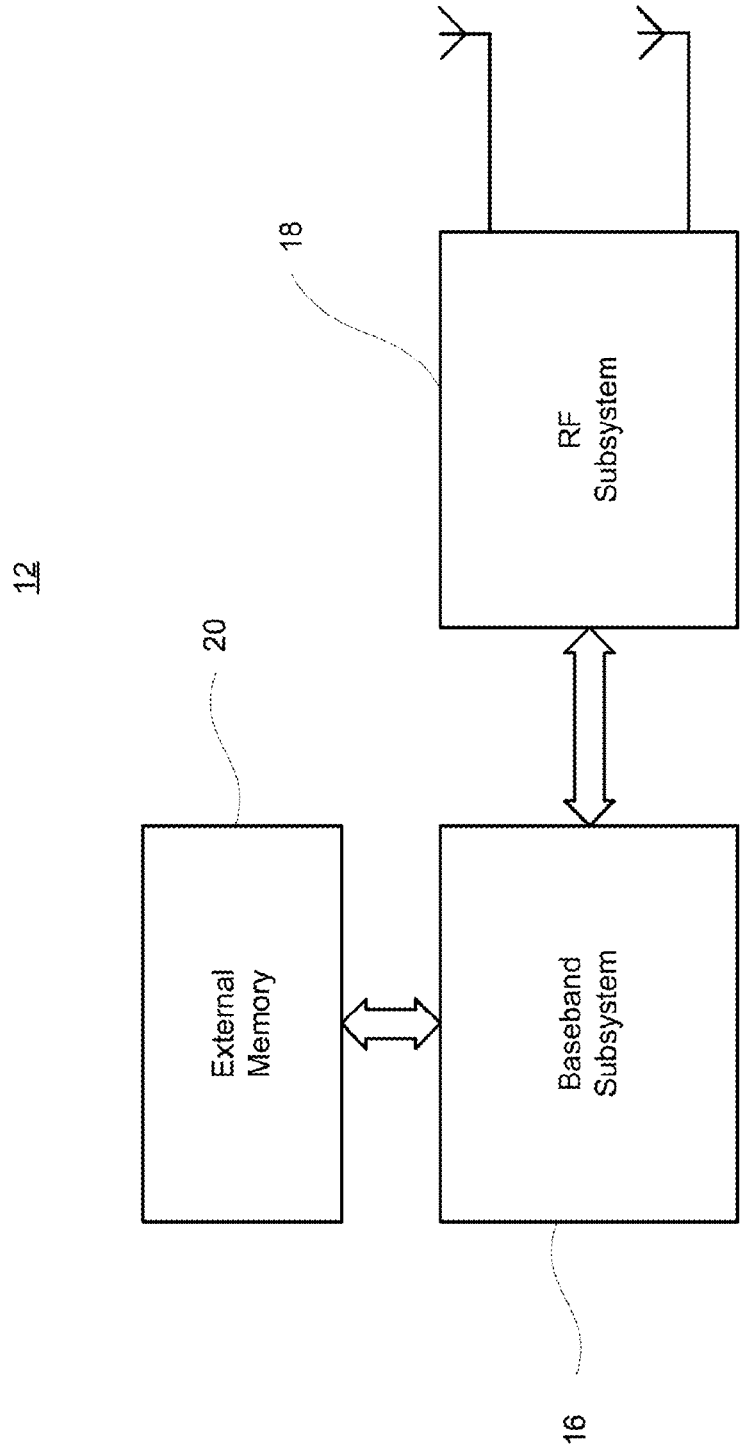
FIG. 2 illustrates a wireless mobile station diagram, which may be employed with aspects of the invention described herein.
Figure 3:
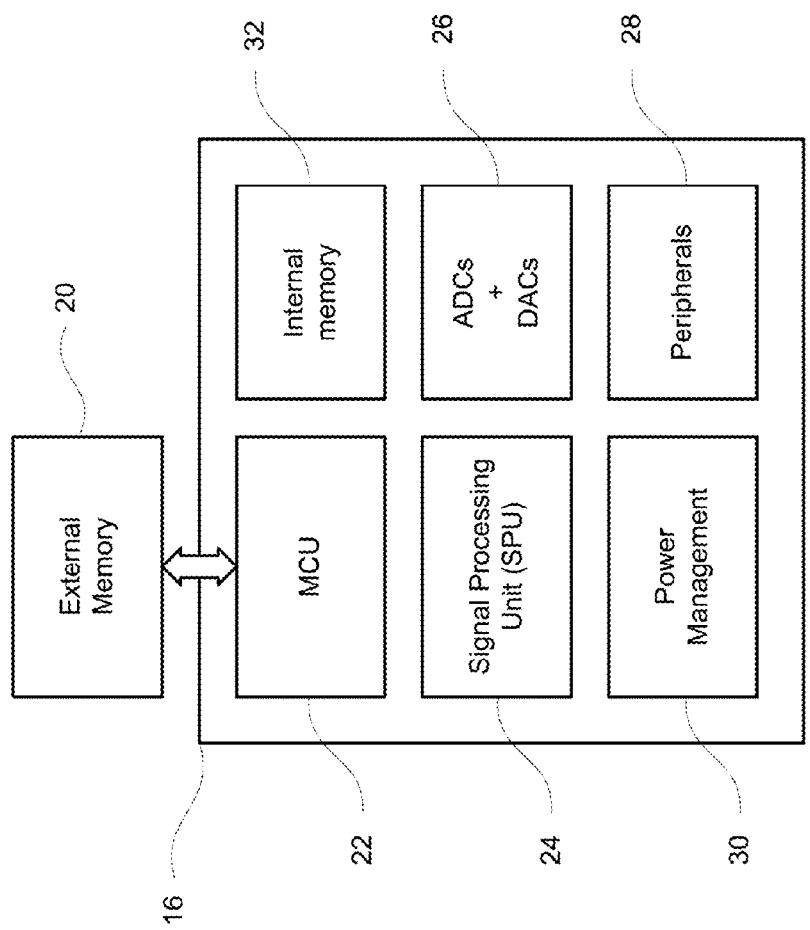
FIG. 3 illustrates a baseband subsystem for a wireless mobile station, which may be employed with aspects of the invention described herein.
Figure 4:
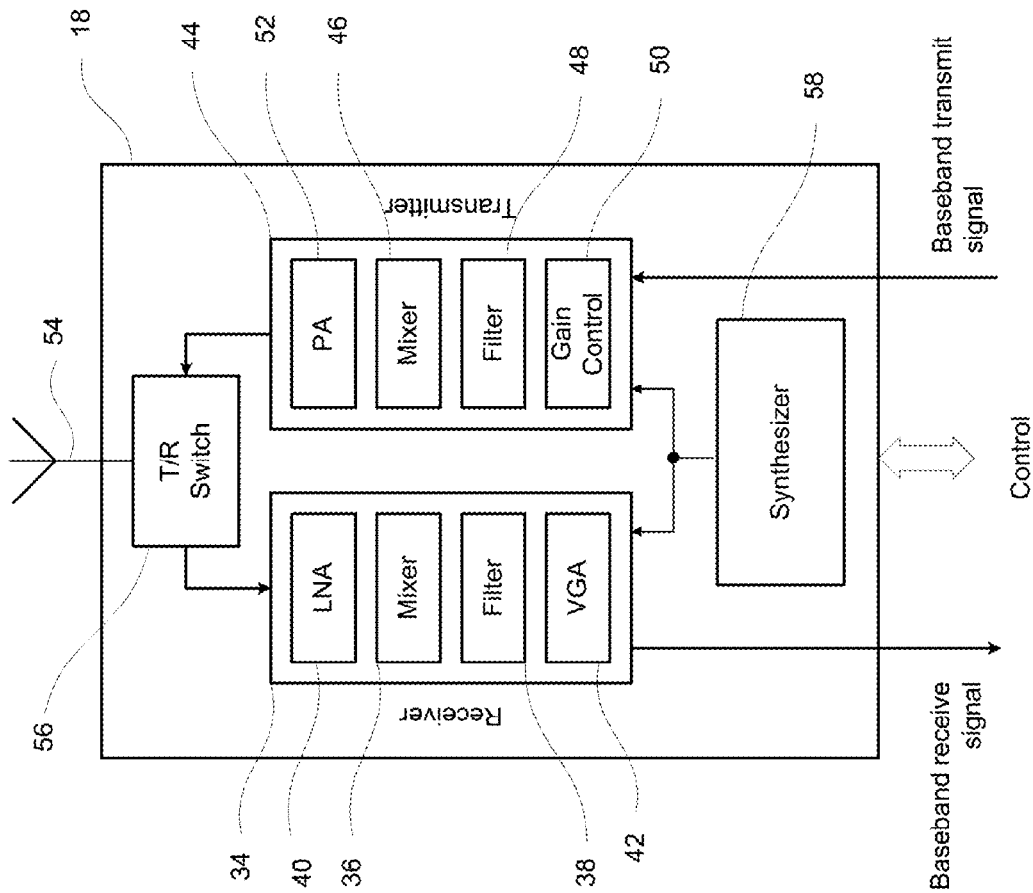
FIG. 4 illustrates an RF subsystem for a wireless mobile station, which may be employed with aspects of the invention described herein.
Figure 6:
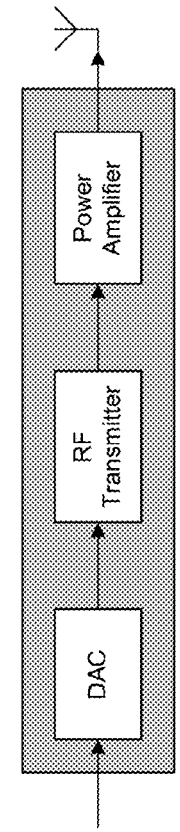
FIG. 6 illustrates the transmit chain of a wireless communication system, which may be employed with aspects of the invention described herein.
Figure 5:
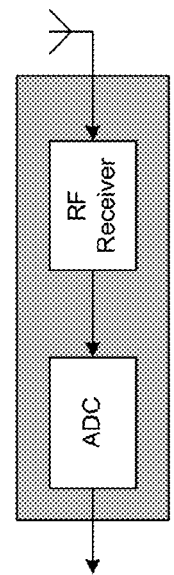
FIG. 5 illustrates the receive chain of a wireless communication system, which may be employed with aspects of the invention described herein.
Figure 7:
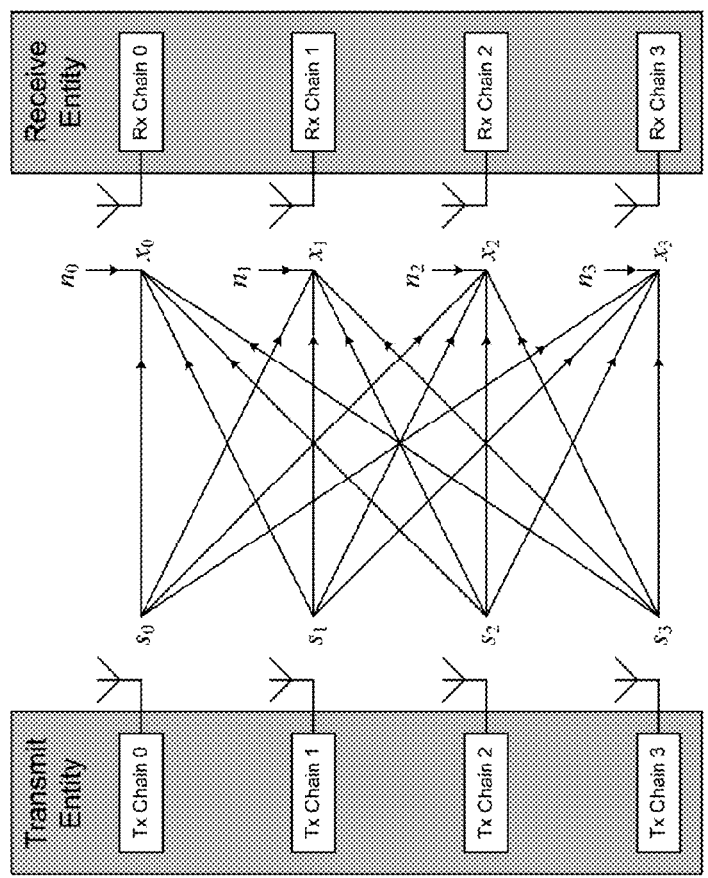
FIG. 7 illustrates an example of a SM-MIMO wireless communication system with four transmit chains at the transmit entity and four receive chains at the receive entity, which may be employed with aspects of the invention described herein.

Aspects of the present invention may be implemented in firmware of the MCU or the SPU of the baseband subsystem 16 shown in FIG. 3. In another alternative, aspects of the present invention may also be implemented as a combination of firmware and hardware of the baseband subsystem 16. By way of example, aspects of the present invention may be implemented in any communication entity in the wireless communication systems such as client terminal, the base station and others.

In accordance with such aspects of the present invention, the Lookup Table M-algorithm process may be applied to various wireless communication systems such as systems based on an IEEE 802.16 wireless communication standard, an IEEE 802.11 wireless communication standard, an IEEE 802.20 wireless communication standard, Wideband Code Division Multiple Access (WCDMA) wireless communication standard, a 3GPP wireless communication standard, or a Long Term Evolution (LTE), a 3GPP wireless communication standard.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A method of decoding spatially multiplexed signals received by a wireless device, the method comprising:

receiving, using two or more receive chains, a plurality of symbols from a transmitting device;

deriving, using one or more processing devices, an estimated channel matrix H from the plurality of received symbols;

decomposing, using the one or more processing devices, the estimated channel matrix H into a unitary matrix Q and a triangular matrix R;

generating, using the one or more processing devices, a distance for each constellation point in a predetermined set of L constellation points from the Q and R matrices, L being an integer greater than one;

deriving, using the one or more processing devices, an index corresponding to the constellation point having a minimum distance;

identifying, using the one or more processing devices, a list of M−1 nearest neighbors corresponding to the derived index, wherein M identifies a number of candidate neighbor symbol sequences, M being an integer greater than one;

determining by the one or more processing devices, using the list of M−1 candidate neighbors, distances for all L*M pairs of constellation point vectors;

identifying, using the one or more processing devices, the index of the constellation point pair corresponding to the minimum distance;

determining, using the one or more processing devices, distances for the L*M pairs of constellation point vectors for a predetermined length of symbol sequences; and selecting, using the one or more processing devices, the constellation point vector corresponding to the minimum distance as a decoded vector to identify a given one of the plurality of received symbols.

2. The method of claim 1, wherein each distance corresponds to a distance metric, and wherein determining a minimum distance metric among K distance metrics requires K−1 comparisons, K being an integer greater than one.

3. The method of claim 2, further comprising pipelining the comparisons so that after each distance metric is determined that distance metric is compared against a current minimum distance metric.

4. The method of claim 1, wherein the set of L constellation points in a constellation are associated with a constellation point geometry, and the value of M is specifically selected for each symbol sequence of the constellation.

5. The method of claim 4, wherein for a given constellation geometry, the number of candidate neighbor symbol sequences differs depending on a location of a corresponding symbol sequence in the constellation.

6. The method of claim 4, wherein the candidate neighbor symbol sequences that are located at corners in the constellation have a fewer number of nearest neighbor symbol sequences than other candidate neighbor symbol sequences.

7. The method of claim 4, wherein the candidate neighbor symbol sequences that are located at edges but not corners in the constellation have a greater number of nearest neighbor symbol sequences when compared to candidate neighbor symbol sequences located at the corners.

8. The method of claim 4, wherein candidate neighbor symbol sequences not located at edges or corners in the constellation have a greater number of nearest neighbor symbol sequences when compared to candidate neighbor symbol sequences that are located at the corners and at the edges of the constellation.

9. The method of claim 1, wherein the value of M is dynamically chosen based on a location of given one of the candidate neighbor symbol sequences corresponding to the minimum distance.

10. A wireless receiver apparatus configured to decode spatially multiplexed signals, the apparatus comprising:
- a plurality of receive chains configured to receive spatially multiplexed signals including a plurality of symbols from a transmitting device; and
- one or more processing devices operatively coupled to the plurality of receive chains, the one or more processing devices being configured to:
  - derive an estimated channel matrix H from the plurality of received symbols;
  - decompose the estimated channel matrix H into a unitary matrix Q and a triangular matrix R;
  - generate a distance for each constellation point in a predetermined set of L constellation points from the Q and R matrices, L being an integer greater than one;
  - derive an index corresponding to the constellation point having a minimum distance;
  - identify a list of M−1 nearest neighbors corresponding to the derived index, wherein M identifies a number of candidate neighbor symbol sequences, M being an integer greater than one;
  - determine using the list of M−1 candidate neighbors, distances for all L*M pairs of constellation point vectors;
  - identify the index of the constellation point pair corresponding to the minimum distance;
  - determine distances for the L*M pairs of constellation point vectors for a predetermined length of symbol sequences; and
  - select the constellation point vector corresponding to the minimum distance as a decoded vector to identify a given one of the plurality of received symbols.

11. The apparatus of claim 10, wherein the set of L constellation points in a constellation are associated with a constellation point geometry, and the value of M is selected by the one or more processing devices for each symbol sequence of the constellation.

12. The apparatus of claim 11, wherein for a given constellation geometry, the number of candidate neighbor symbol sequences differs depending on a location of a corresponding symbol sequence in the constellation.

13. The apparatus of claim 11, wherein the candidate neighbor symbol sequences that are located at corners in the constellation have a fewer number of nearest neighbor symbol sequences than other candidate neighbor symbol sequences.

14. The apparatus of claim 11, wherein the candidate neighbor symbol sequences that are located at edges but not corners in the constellation have a greater number of nearest neighbor symbol sequences when compared to candidate neighbor symbol sequences located at the corners.

15. The apparatus of claim 11, wherein candidate neighbor symbol sequences not located at edges or corners in the constellation have a greater number of nearest neighbor symbol sequences when compared to candidate neighbor symbol sequences that are located at the corners and at the edges of the constellation.

16. The apparatus of claim 10, wherein the value of M is dynamically chosen by the one or more processing devices based on a location of given one of the candidate neighbor symbol sequences corresponding to the minimum distance.

17. A non-transitory recording medium storing instructions thereon, the instructions, when executed by one or more processing devices, cause the one or more processing devices to execute a method of decoding spatially multiplexed signals received by a wireless device, the method comprising:
- receiving, using two or more receive chains, a plurality of symbols from a transmitting device;
- deriving, using one or more processing devices, an estimated channel matrix H from the plurality of received symbols;
- decomposing, using the one or more processing devices, the estimated channel matrix H into a unitary matrix Q and a triangular matrix R;
- generating, using the one or more processing devices, a distance for each constellation point in a predetermined set of L constellation points from the Q and R matrices, L being an integer greater than one;
- deriving, using the one or more processing devices, an index corresponding to the constellation point having a minimum distance;
- identifying, using the one or more processing devices, a list of M−1 nearest neighbors corresponding to the derived index, wherein M identifies a number of candidate neighbor symbol sequences, M being an integer greater than one;
- determining by the one or more processing devices, using the list of M−1 candidate neighbors, distances for all L*M pairs of constellation point vectors;
- identifying, using the one or more processing devices, the index of the constellation point pair corresponding to the minimum distance;
- determining, using the one or more processing devices, distances for the L*M pairs of constellation point vectors for a predetermined length of symbol sequences; and
- selecting, using the one or more processing devices, the constellation point vector corresponding to the minimum distance as a decoded vector to identify a given one of the plurality of received symbols.

18. The non-transitory recording medium of claim 17, wherein each distance corresponds to a distance metric, determining a minimum distance metric among K distance metrics requires K−1 comparisons, K being an integer greater than one, and the method further comprises pipelining the comparisons so that after each distance metric is determined that distance metric is compared against a current minimum distance metric.

19. The non-transitory recording medium of claim 17, wherein the set of L constellation points in a constellation are associated with a constellation point geometry, and the value of M is specifically selected for each symbol sequence of the constellation.

20. The non-transitory recording medium of claim 17, wherein the value of M is dynamically chosen based on a location of given one of the candidate neighbor symbol sequences corresponding to the minimum distance.

* * * * *